Sept. 16, 1930.  H. S. PETCH  1,776,130
PROTECTION OF ELECTRIC CIRCUITS
Filed Sept. 19, 1928
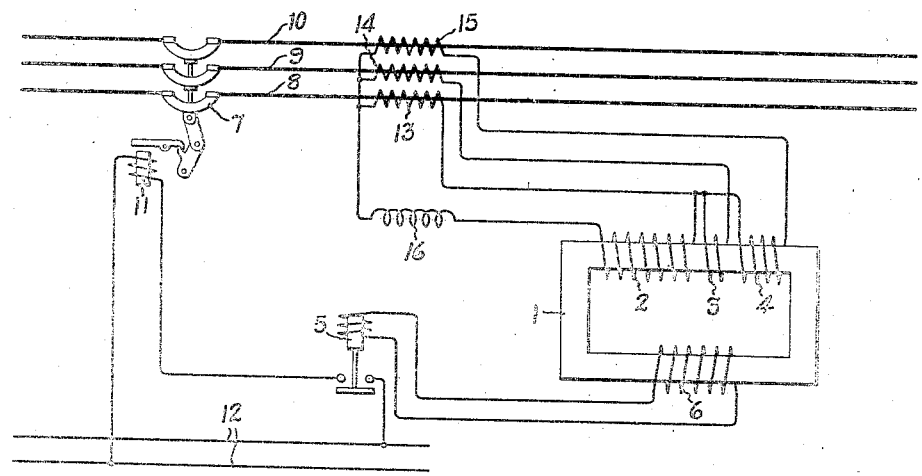
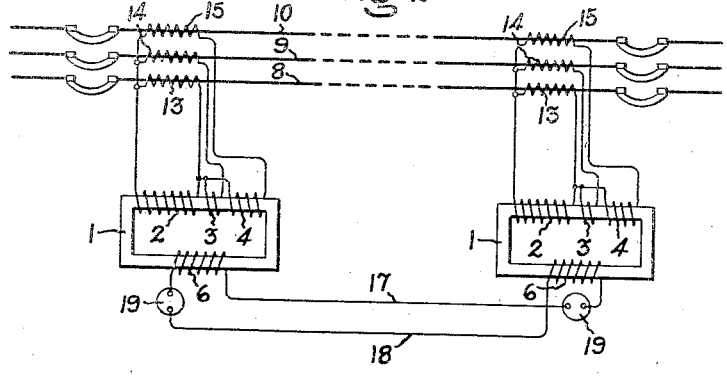
Inventor:
Herbert S. Petch,
by Charles E. Tulla
His Attorney.

Patented Sept. 16, 1930

1,776,130

UNITED STATES PATENT OFFICE

HERBERT STANLEY PETCH, OF EDGWARE, ENGLAND, ASSIGNOR TO GENERAL ELECTRIC COMPANY, A CORPORATION OF NEW YORK

PROTECTION OF ELECTRIC CIRCUITS

Application filed September 19, 1928, Serial No. 306,972, and in Great Britain October 19, 1927.

My invention relates to improvements in the protection of electric circuits such as feeders, interconnectors, or sections thereof, transformers and the like, of the kind in which a neutral point of the circuit is earthed. It relates not only to protective systems of the kind in which the current flow at one end of the protected circuit is balanced against the current flow at the other end of the protected circuit, or in which the currents flowing in two circuits in parallel are compared, by means of similar protective apparatus at each end, or on each parallel circuit such as protective systems of the circulating current or opposed voltage type, but it is also applicable to protective systems in which the protective apparatus operates at a point on a protective circuit to open the circuit in response to an interphase or earth fault. Usually a protective relay is arranged to control a circuit for the trip coil of a circuit breaker controlling the protected circuit, although, if preferred, the protective device may be arranged to operate a warning signal instead of actually effecting the opening of the protected circuit under fault conditions.

In a simple polyphase protective system, the secondaries of current transformers energizes responsively to current in the individual phases may be end-connected together and provided with protective relays in series with each secondary winding. These relays are then responsive to interphase faults occurring on the protected circuit. An earth fault responsive relay may then be connected across the end-connected points of the secondary windings, this relay being energized responsively to the vector sum of the currents in the protected circuit. Now, this protective apparatus often includes four relays for a three-phase circuit but, in practice, one of the interphase fault responsive relays may be omitted, as an interphase fault will then operate the other relay between the two phases affected and thus afford complete protection. So that, in general, for an $x$-phase polyphase circuit $x$ relays are required to give complete protection.

In the protective system described in British Patent No. 188,001, one of the current transformers aforesaid of each protective apparatus is replaced by a double or split-winding transformer, and the connections are such that only two relays need be used with each protective apparatus, one responding to all interphase faults on the protected circuit and the other to earth faults.

An arrangement which has recently been proposed for protecting a three-phase circuit involves a transformer device provided with windings of $n$, $(n+m)$ and $(n+2m)$ turns, respectively, which are energized responsively to the currents in the respective phases of the protected circuit. A secondary winding on this transformer device is then connected to a simple relay, and this relay will respond either to earth faults or to interphase faults. In this system the number $m$ is relatively small compared with $n$, for example, in the nature of 3 to 20. The theory of operation of this system is described in a pamphlet issued by the "Conference Internationale des Grands Reseaux Electriques" and numbered 74.

My invention is an improvement in, or modification of, the arrangement last described, in which one simple relay may be used for protecting a polyphase circuit against earth faults or interphase faults. Broadly speaking, it comprises the combination with a transformer device, having windings of a materially different number of turns energized responsively to currents in some of the individual phase conductors of a polyphase circuit, and to the vector sum of these currents, respectively, of a protective device, the winding of which is energized from the transformer device and which is responsive either to earth faults or to interphase faults. An object of my invention is to effect a considerable reduction in the number of turns of the transformer device.

My invention will be better understood from the following description when considered in connection with the accompanying drawing and its scope will be pointed out in the appended claims.

In the accompanying drawing, Fig. 1 illustrates diagrammatically an embodiment of my invention and Fig. 2 illustrates a modification of my invention.

In the embodiment of my invention shown in Fig. 1, the transformer device is shown as including a core 1 having three primary windings 2, 3 and 4 of $n$, $m$, and $2m$ turns, respectively, where $m$ is small compared with $n$. A protective relay 5 is connected to an auxiliary or secondary winding 6 on the core 1. This results in the saving of $2n$ turns altogether over the arrangement above described. The relay 5, as shown, is arranged to control a circuit breaker 7 in a three phase circuit including conductors 8, 9, 10 by means of its trip coil 11, operating current for which may be supplied from a suitable source such as a control bus 12. Associated with the three phase conductors 8, 9, 10 are current transformers 13, 14, 15 respectively which are assumed of like ratios and which are provided for energizing the windings 2, 3 and 4 of materially different turns. The winding 4 of $2m$ turns is connected in series with the secondary of the current transformer 15 associated with the conductor 10; the winding 3 of $m$ turns is connected in series with the secondary of the current transformer 14 associated with the conductor 9, and no winding with that of conductor 8 in the same sense. The other ends of the windings 3 and 4 of $m$ and $2m$ turns, are, however, end-connected to the appropriate end of the secondary winding of the current transformer 13 associated with conductor 8 and the free ends of the secondary windings of all the current transformers are star connected. The winding of $n$ turns is then arranged in a residual current circuit connecting the common or star point of the current transformer secondary windings with the common point of the two windings 3 and 4 of $m$ and $2m$ turns. The winding 2 is therefore connected to be energized in accordance with the vector sum of the currents in the phase conductors 8, 9, 10. This residual current circuit may include an impedance 16.

With this arrangement, if the auxiliary or secondary winding 6 on the transformer device requires a magnetomotive force of $M$ ampere turns, for the protective device to be operated, and if $r$ is the ratio of transformation in the current transformers 13, 14, 15, the following represent the values of the fault currents in the respective phase conductors under different conditions for which operation will be effected:—

*Earth faults*

| Conductors | Fault current |
|---|---|
| 8 | $\dfrac{M.r}{n}$ (i) |
| 9 | $\dfrac{M.r}{n+m}$ (ii) |
| 10 | $\dfrac{M.r}{n+2m}$ (iii) |

*Interphase faults*

| | | |
|---|---|---|
| 8—9 | $\dfrac{M.r}{m}$ | (iv) |
| 9—10 | $\dfrac{M.r}{2m-m}=\dfrac{M.r}{m}$ | (v) |
| 10—8 | $\dfrac{M.r}{2m}$ | (vi) |

If we assume $M$ to equal 400 ampere turns, and $r$ to be 10, and if we take $n$ equal to 200 and $m$ equal to 30, the values of fault currents necessary to operate the protective device in the different conditions are approximately as follows:

(i) 20.
(ii) 17.
(iii) 15.
(iv) 133.
(v) 133.
(vi) 67.

Calculating in the same way it will be found that for a fault effecting all three phases, operation of the protective relay will be effected at a value of fault current represented by $$\frac{400\times 10}{3m}=79$$

approximately.

The divergency between the earth fault currents and the interphase fault currents on which the protective device responds may, however, be adjusted by the use of the impedance 16 above referred to. This impedance performs its function by virtue of the fact that it imposes an additional burden on the current transformers in earth fault conditions only. As a result of this additional burden the ratio of the particular current transformer on the conductor which is grounded will in effect decrease. Consequently, if a suitable impedance is added in the leakage circuit, it will so modify the ratio of the transformers under leakage fault conditions that the above figures will become approximately:—

(i) 77.
(ii) 65.
(iii) 57.
(iv) 133.
(v) 133.
(vi) 67.

It will readily be understood from the modification of my invention shown in Fig. 2, that, when the invention is applied to a protective device of the balanced type, instead of the secondary winding 6 on the transformer device being connected directly to the protective relay it will be connected to one end of a suitable pilot circuit including conductors 17, 18 at the other end of which is arranged a similar transformer. In this pilot circuit, the transformer secondary windings 6 may be connected for normally circulating current or opposed electromotive forces as will be apparent to those skilled in the art. In the latter case, as shown relays 19 may be connected in series in the pilot circuit while in the former they may be connected across normally equipotential points. This arrangement reduces the number of pilot conductors to two at the same time providing protection against both earth and interphase faults with the minimum number of relays.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:—

1. A protective arrangement for a three phase circuit including a transformer device having a plurality of windings of $n$, $m$ and $2m$ turns respectively, where $m$ is small relatively to $n$, the windings of $m$ and $2m$ turns being connected to be energized respectively in accordance with the currents in two of the phase conductors of the circuit and the winding of $n$ turns being connected to be energized in accordance with the residual current of the circuit.

2. A protective arrangement for a three phase circuit including a transformer device having a plurality of windings of $n$, $m$ and $2m$ turns respectively, where $m$ is small relatively to $n$, the windings of $m$ and $2m$ turns being connected to be energized respectively in accordance with the currents in two of the phase conductors of the circuit and the winding of $n$ turns being connected to be energized in accordance with the residual current of the circuit, and relay means connected to be energized in accordance with the sum of the effects of said windings.

3. A protective arrangement for a three phase circuit including a transformer device having a plurality of primary windings of $n$, $m$ and $2m$ turns respectively, where $m$ is small relatively to $n$, the windings of $m$ and $2m$ turns being connected to be energized respectively in accordance with the currents in two of the phase conductors of the circuit and the winding of $n$ turns being connected to be energized in accordance with the residual current of the circuit, and a secondary winding connected to be energized responsively to the sum of the effects of said primary windings.

4. A protective arrangement for a three phase circuit including a transformer device having a plurality of windings of $n$, $m$ and $2m$ turns respectively, where $m$ is small relatively to $n$, the windings $m$ and $2m$ turns being connected to be energized respectively in accordance with the currents in two of the phase conductors of the circuit and the winding of $n$ turns being connected to be energized in accordance with the residual current of the circuit, and an impedance connected in series with the winding of $n$ turns.

In witness whereof, I have hereunto set my hand this fourth day of September, 1928.

HERBERT STANLEY PETCH.